US012681222B2

(12) United States Patent
Kido et al.

(10) Patent No.: US 12,681,222 B2
(45) Date of Patent: Jul. 14, 2026

(54) SEMICONDUCTOR NANOPARTICLE COMPLEX, SEMICONDUCTOR NANOPARTICLE COMPLEX DISPERSION LIQUID, SEMICONDUCTOR NANOPARTICLE COMPLEX COMPOSITION, AND SEMICONDUCTOR NANOPARTICLE COMPLEX CURED FILM

(71) Applicant: SHOEI CHEMICAL INC., Tokyo (JP)

(72) Inventors: Makoto Kido, Tosu (JP); Hirokazu Sasaki, Tosu (JP)

(73) Assignee: SHOEI CHEMICAL INC., Tokyo (JP)

( * ) Notice: Subject to any disclaimer, the term of this patent is extended or adjusted under 35 U.S.C. 154(b) by 1027 days.

(21) Appl. No.: 17/596,483

(22) PCT Filed: Jun. 3, 2020

(86) PCT No.: PCT/JP2020/021873
§ 371 (c)(1),
(2) Date: Dec. 10, 2021

(87) PCT Pub. No.: WO2020/250762
PCT Pub. Date: Dec. 17, 2020

(65) Prior Publication Data
US 2022/0308274 A1 Sep. 29, 2022

(30) Foreign Application Priority Data

Jun. 13, 2019 (JP) ................................. 2019-110305

(51) Int. Cl.
| | |
|---|---|
| *G02B 5/20* | (2006.01) |
| *C09K 11/70* | (2006.01) |
| *B82Y 20/00* | (2011.01) |
| *B82Y 30/00* | (2011.01) |
| *B82Y 40/00* | (2011.01) |

(52) U.S. Cl.
CPC ............ *G02B 5/207* (2013.01); *C09K 11/703* (2013.01); *G02B 5/206* (2013.01); *B82Y 20/00* (2013.01); *B82Y 30/00* (2013.01); *B82Y 40/00* (2013.01); *G02B 2207/101* (2013.01)

(58) Field of Classification Search
CPC .... G02B 5/207; C09K 11/703; C09K 11/025; C09K 11/0883; C09K 11/883; B82Y 20/00; B82Y 40/00; C08K 9/04; C09D 5/22; C09D 11/037; C09D 11/322; C09D 11/50
See application file for complete search history.

(56) References Cited

U.S. PATENT DOCUMENTS

| | | | | |
|---|---|---|---|---|
| 12,359,123 B2 * | 7/2025 | Kido | ...................... | C09K 11/70 |
| 12,365,836 B2 * | 7/2025 | Kido | ...................... | C09K 11/06 |
| 12,509,624 B1 * | 12/2025 | Klein | ...................... | C09K 9/00 |
| 2018/0187074 A1 * | 7/2018 | Sasaki | ...................... | C09K 11/06 |
| 2025/0313750 A1 * | 10/2025 | Kido | ...................... | C09K 11/70 |
| 2026/0071116 A1 * | 3/2026 | Park | ...................... | C09K 11/02 |

FOREIGN PATENT DOCUMENTS

| | | | | | |
|---|---|---|---|---|---|
| CN | 102925138 A | | 2/2013 | | |
| CN | 106367060 A | * | 2/2017 | ............. | B82Y 20/00 |
| CN | 106479503 A | | 3/2017 | | |
| CN | 108102640 A | | 6/2018 | | |
| CN | 108624320 A | * | 10/2018 | ............. | B82Y 40/00 |
| JP | 2002121549 A | | 4/2002 | | |
| JP | 2002162501 A | | 6/2002 | | |
| JP | 2009216603 A | | 9/2009 | | |
| JP | 2013136498 A | | 7/2013 | | |
| JP | 2019073705 A | | 5/2019 | | |
| KR | 20180106125 A | * | 10/2018 | ............. | C09K 11/02 |
| KR | 1020190009763 A | | 1/2019 | | |
| WO | WO-2017038487 A1 | * | 3/2017 | ............. | B82Y 5/00 |
| WO | 2017188300 A1 | | 11/2017 | | |
| WO | 2018016589 A1 | | 1/2018 | | |

OTHER PUBLICATIONS

Clarivate Analytics machine translation of CN 106367060 A published Feb. 1, 2017 (Year: 2017).*
Clarivate Analytics machine translation of CN 108624320 A published Oct. 9, 2018 (Year: 2018).*
Clarivate Analytics machine translation of KR 20180106125 A published Oct. 1, 2018 (Year: 2018).*
Korean Intellectual Property Office, Office Action Issued in Application No. 10-2021-7042424, Jul. 30, 2024, 15 pages.
ISA Japan Patent Office, International Search Report Issued in Application No. PCT/JP2020/021873, Aug. 25, 2020, WIPO, 6 pages.
Dubois, F. et al., "A Versatile Strategy for Quantum Dot Ligand Exchange," Journal of the American Chemical Society, vol. 129, No. 3, Dec. 23, 2006, 2 pages.

(Continued)

*Primary Examiner* — Jane L Stanley
(74) *Attorney, Agent, or Firm* — Alleman Hall LLP

(57) ABSTRACT

Provided is a semiconductor nanoparticle complex in which two or more kinds of ligands including a ligand I and a ligand II are coordinated to a surface of a semiconductor nanoparticle. The ligands are each an organic ligand including an organic group and a coordinating group. The ligand I is a thiocarboxylic acid represented by the following general formula (1). The mole fraction of the ligand I in the ligands is 0.2 mol % to 35.0 mol %.

General formula (1):

$$HS-X-(COOH)n \qquad (1)$$

(In general formula (1), X is a (n+1)-valent hydrocarbon group, and n is a natural number of 1 to 3.) The present disclosure provides a semiconductor nanoparticle complex dispersible at a high mass fraction in a dispersion medium having polarity while a high fluorescence quantum yield (QY) of the semiconductor nanoparticle is retained.

18 Claims, No Drawings

(56)        References Cited

OTHER PUBLICATIONS

Mahmoud, W. et al., "6-Mercaptohexanoic acid assisted synthesis of high quality InP quantum dots for optoelectronic applications," Superlattices and Microstructures, vol. 56, Jan. 17, 2013, 6 pages.
Jin, T., "Semiconductor quantum dots: their synthesis and application to bioscience," Production and Technology, vol. 63, No. 2 , 2011, 13 pages (Submitted with machine translation).
Pong, B. et al., "Modified Ligand-Exchange for Efficient Solubilization of CdSe/ZnS Quantum Dots in Water: A Procedure Guided by Computational Studies," Langmuir, vol. 24, Apr. 16, 2008, 7 pages.
Rahman, S. et al., "Thiolate-Capped CdSe/ZnS Core-Shell Quantum Dots for the Sensitive Detection of Glucose," Sensors, vol. 17, No. 7, Jul. 1, 2017, 12 pages.
Wenger, W. et al., "Functionalization of cadmium selenide quantum dots with poly(ethylene glycol): Ligand exchange, surface coverage, and dispersion stability," Langmuir, vol. 33, Aug. 2, 2017, 25 pages.
Taiwan Intellectual Property Office, Office Action and Search Report Issued in Application No. 109119767, Aug. 17, 2023, 22 pages.
China National Intellectual Property Administration, Office action issued in Chinese Application No. 202080043419.9, Mar. 10, 2023, 14 pages.

* cited by examiner

SEMICONDUCTOR NANOPARTICLE COMPLEX, SEMICONDUCTOR NANOPARTICLE COMPLEX DISPERSION LIQUID, SEMICONDUCTOR NANOPARTICLE COMPLEX COMPOSITION, AND SEMICONDUCTOR NANOPARTICLE COMPLEX CURED FILM

TECHNICAL FIELD

The present invention relates to a semiconductor nanoparticle complex, a semiconductor nanoparticle complex dispersion liquid, a semiconductor nanoparticle complex composition, and a semiconductor nanoparticle complex cured film.

BACKGROUND ART

Semiconductor nanoparticles small enough to exhibit quantum confinement effects have a bandgap dependent on the particle size. An exciton formed in a semiconductor nanoparticle by such means as photoexcitation or charge injection emits a photon having energy depending on the bandgap due to recombination. Emission having a desired wavelength therefore can be obtained by selecting the composition of semiconductor nanoparticles and their particle size as appropriate.

Early research on semiconductor nanoparticles focused on elements including Cd and Pb. However, since Cd and Pb are substances under regulations such as Restriction on Hazardous Substances, more recent studies have shifted to non-Cd or non-Pb semiconductor nanoparticles.

Semiconductor nanoparticles find various applications such as displays, biological labeling, and solar cells.

CITATION LIST

Patent Literature

Patent Literature 1: Japanese Patent Application Laid-open No. 2013-136498

Non-Patent Literature

Non-Patent Literature 1: Jin Takashi, "Semiconductor quantum dots: their synthesis and application to bioscience", Manufacturing & Technology Vol. 63, No. 2, pp. 58-63, 2011.

Non-Patent Literature 2: Fabien Dubois et al., "A Versatile Strategy for Quantum Dot Ligand Exchange" J. AM. CHEM. SOC. Vol. 129, No. 3, pp. 482-483, 2007.

Non-Patent Literature 3: Boon-Kin Pong et al., "Modified Ligand-Exchange for Efficient Solubilization of CdSe/ZnS Quantum Dots in Water: A Procedure Guided by Computational Studies" Langmuir Vol. 24, No. 10, pp. 5270-5276, 2008.

Non-Patent Literature 4: Samsulida Abd. Rahman et al., "Thiolate-Capped CdSe/ZnS Core-Shell Quantum Dots for the Sensitive Detection of Glucose" Sensors Vol. 17, No. 7, p. 1537, 2017.

Non-Patent Literature 5: Whitney Nowak Wenger et al., "Functionalization of Cadmium Selenide Quantum Dots with Poly(ethylene glycol): Ligand Exchange, Surface Coverage, and Dispersion Stability" Langmuir, Vol. 33, No. 33, pp. 8239-8245, 2017.

SUMMARY OF INVENTION

Technical Problem

Semiconductor nanoparticles and semiconductor nanoparticle complexes are dispersed in a dispersion medium and thereby prepared as a dispersion liquid to be applied in various fields. In particular, in display applications, a dispersion liquid having nanoparticles dispersed in a polar organic dispersion medium such as glycol ethers and glycol ether esters is used.

Semiconductor nanoparticles and semiconductor nanoparticle complexes synthesized by a liquid phase method are hydrophobic and therefore easily dispersed in a nonpolar dispersion medium, but it has been difficult to disperse such nanoparticles into a polar dispersion medium having an SP value of 8.5 or more. A ligand exchange method is known as a method for making semiconductor nanoparticles dispersible in a polar dispersion medium having an SP value of 8.5 or more.

The ligand exchange method is a method that involves replacing a ligand included in a semiconductor nanoparticle complex obtained by bonding the ligand to a surface of a semiconductor nanoparticle, with a ligand having a hydrophilic group. The resultant semiconductor nanoparticle complex can be dispersed in a polar dispersion medium. The semiconductor nanoparticle complexes disclosed in Non-Patent Literature 1 to Non-Patent Literature 5 and Patent Literature 1 enable dispersion of semiconductor nanoparticles into a polar dispersion medium but unfortunately suffer from deterioration in luminous efficiency.

In order to solve the problem above, an object of the present invention is to provide a semiconductor nanoparticle complex dispersible in an organic dispersion medium having polarity while retaining a high fluorescence quantum yield (QY) of semiconductor nanoparticles.

Solution to Problem

Thiocarboxylic acid is known as a ligand for dispersing semiconductor nanoparticles in water which is a kind of polar dispersion media. A semiconductor nanoparticle complex in which thiocarboxylic acid is coordinated to a semiconductor nanoparticle is treated with an alkaline solution so that the carboxy group of thiocarboxylic acid is ionized into carboxylate, and this carboxylate is ionized by hydration to cause electrostatic repulsion, enabling dispersion in water.

However, in a polar organic solvent among polar dispersion media, since the interaction between a solvent and a salt is weaker than in water, carboxylate is unable to be ionized by solvation, and dispersion by electrostatic repulsion is impossible. The unionized thiocarboxylic acid ligand incurs aggregation due to hydrogen bonding between carboxylic acids and bonding of a thiol group and a carboxy group to different quantum dot surfaces. The dispersion in a polar organic dispersion medium using thiocarboxylic acid is therefore difficult. For this reason, thiocarboxylic acid has not been actively employed as a ligand for polar organic solvent dispersion.

The inventors of the present invention, however, have found that when thiocarboxylic acid that does not contribute to dispersion in an organic dispersion medium is coordinated to a semiconductor nanoparticle together with another kind of ligand, the resultant semiconductor nanoparticle complex can be dispersed into a polar organic solvent while a high fluorescence quantum yield is retained.

Specifically, the present invention (1) provides a semiconductor nanoparticle complex comprising an organic ligand including a ligand I coordinated to a surface of a semiconductor nanoparticle, in which the organic ligand is a ligand including an organic group and a coordinating group, the ligand I is a thiocarboxylic acid represented by the following general formula (1), and a mole fraction of the ligand I in the organic ligand is 0.20 mol % to 35.00 mol %, general formula (1):

$$HS-X-(COOH)_n \qquad (1)$$

(where X is a (n+1)-valent hydrocarbon group, and n is a natural number of 1 to 3).

The present invention (2) provides the semiconductor nanoparticle complex according to (1), in which the organic ligand at least includes the ligand I and a polar ligand II having an SP value of 9.0 or more.

The present invention (3) provides the semiconductor nanoparticle complex according to (2), in which the polar ligand II has an SP value of 9.3 or more.

The present invention (4) provides the semiconductor nanoparticle complex according to any one of (1) to (3), in which the ligand I has a molecular weight of 300 or less.

The present invention (5) provides the semiconductor nanoparticle complex according to any one of (2) to (4), in which the polar ligand II has a molecular weight that is greater than a molecular weight of the ligand I.

The present invention (6) provides the semiconductor nanoparticle complex according to any one of (1) to (5), in which the ligand I comprises one or more kinds selected from the group consisting of thioglycolic acid, mercaptopropionic acid, mercaptohexanoic acid, mercaptoundecanoic acid, and thiomalic acid.

The present invention (7) provides the semiconductor nanoparticle complex according to any one of (1) to (6), in which the ligand I comprises one or more kinds selected from the group consisting of thioglycolic acid, mercaptopropionic acid, and thiomalic acid.

The present invention (8) provides the semiconductor nanoparticle complex according to any one of (2) to (7), in which the coordinating group of the polar ligand II is a carboxy group or a mercapto group.

The present invention (9) provides the semiconductor nanoparticle complex according to any one of (2) to (8), in which an organic group of the polar ligand II includes an ether bond or an ester bond.

The present invention (10) provides the semiconductor nanoparticle complex according to any one of (2) to (9), in which the organic ligand includes an aliphatic ligand.

The present invention (11) provides the semiconductor nanoparticle complex according to (10), in which the aliphatic ligand comprises one or more kinds selected from the group consisting of aliphatic thiols, aliphatic carboxylic acids, aliphatic amines, aliphatic phosphines, and aliphatic phosphine oxides.

The present invention (12) provides the semiconductor nanoparticle complex according to (10) or (11), in which a molar ratio of the aliphatic ligand to the polar ligand II (aliphatic ligand/polar ligand II) is 0.10 to 5.00.

The present invention (13) provides the semiconductor nanoparticle complex according to any one of (10) to (12), in which a molar ratio of the aliphatic ligand to the polar ligand II (aliphatic ligand/polar ligand II) is 0.10 to 3.00.

The present invention (14) provides the semiconductor nanoparticle complex according to any one of (1) to (13), in which the semiconductor nanoparticle contains zinc on the surface of the semiconductor nanoparticle.

The present invention (15) provides the semiconductor nanoparticle complex according to any one of (1) to (14), in which the semiconductor nanoparticle includes indium and phosphorus.

The present invention (16) provides the semiconductor nanoparticle complex according to any one of (1) to (15), in which a fluorescence quantum yield of the semiconductor nanoparticle complex is 85% or higher.

The present invention (17) provides the semiconductor nanoparticle complex according to any one of (1) to (16), in which a full width at half maximum of an emission spectrum of the semiconductor nanoparticle complex is 38 nm or less.

The present invention (18) provides a semiconductor nanoparticle complex dispersion liquid comprising the semiconductor nanoparticle complex according to any one of (1) to (17) dispersed in an organic dispersion medium.

The present invention (19) provides a semiconductor nanoparticle complex composition comprising the semiconductor nanoparticle complex according to any one of (1) to (17) dispersed in a dispersion medium, in which the dispersion medium is a monomer or a prepolymer.

The present invention (20) provides a semiconductor nanoparticle complex cured film comprising the semiconductor nanoparticle complex according to any one of (1) to (17) dispersed in a polymer matrix.

In the subject application, the range denoted by "to" is a range in which both the starting and ending values are inclusive.

Advantageous Effects of Invention

The present invention provides a semiconductor nanoparticle complex dispersible in a polar organic dispersion medium while retaining a high quantum yield.

DESCRIPTION OF EMBODIMENTS

Semiconductor Nanoparticle Complex

The present invention relates to a semiconductor nanoparticle complex in which at least two or more kinds of ligands are coordinated to a semiconductor nanoparticle. In the present invention, the semiconductor nanoparticle complex refers to a semiconducting nanoparticle complex having luminous properties. The semiconductor nanoparticle complex according to the present invention is a particle that absorbs light of 340 nm to 480 nm and emits light having an emission peak wavelength of 400 nm to 750 nm.

The semiconductor nanoparticle complex according to the present invention is a semiconductor nanoparticle complex including an organic ligand including a ligand I coordinated to a surface of a semiconductor nanoparticle, in which the organic ligand is a ligand including an organic group and a coordinating group, the ligand I is a thiocarboxylic acid represented by the following general formula (1):

$$HS-X-(COOH)_n \qquad (1)$$

(where X is a (n+1)-valent hydrocarbon group, and n is a natural number of 1 to 3), and the mole fraction of the ligand I in the organic ligand is 0.20 mol % to 35.00 mol %.

The semiconductor nanoparticle complex according to the present invention has a semiconductor nanoparticle and an organic ligand coordinated to a surface of the semiconductor nanoparticle.

The semiconductor nanoparticle complex according to the present invention has high luminous properties and is dispersible in a polar dispersion medium.

The full width at half maximum (FWHM) of an emission spectrum of the semiconductor nanoparticle complex according to the present invention is preferably 38 nm or less, and further preferably 35 nm or less. With the full width at half maximum of the emission spectrum in the range above, color mixture can be reduced when the semiconductor nanoparticle complex is applied to displays and the like.

The fluorescence quantum yield (QY) of the semiconductor nanoparticle complex according to the present invention is preferably 85% or higher, and more preferably 88% or higher. With the fluorescence quantum yield of the semiconductor nanoparticle complex of 85% or higher, color conversion can be performed more efficiently.

In the present invention, the optical properties of the semiconductor nanoparticle complex can be determined using a quantum yield measurement system. The semiconductor nanoparticle complex is dispersed in a dispersion liquid and irradiated with excitation light to obtain an emission spectrum. The re-excitation fluorescence emission spectrum of re-excited fluorescence emission is eliminated from the obtained emission, and the fluorescence quantum yield (QY) and the full width at half maximum (FWHM) are calculated from the emission spectrum after the re-excitation correction. Examples of the dispersion liquid include n-hexane, PGMEA, and chloroform.

Semiconductor Nanoparticle—

The semiconductor nanoparticle composing the semiconductor nanoparticle complex according to the present invention, that is, the particle to which a ligand is coordinated is not limited as long as it satisfies the luminous properties such as fluorescence quantum yield and full width at half maximum, and may be a particle composed of one kind of semiconductor or may be a particle composed of two or more different kinds of semiconductors. When the semiconductor nanoparticle is a particle composed of two more different kinds of semiconductors, these semiconductors may form a core-shell structure. For example, the semiconductor nanoparticle may be a core-shell type particle having a core containing a Group III element and a Group V element and a shell containing Group II and Group VI elements covering at least a part of the core. The shell may have a plurality of shells of different compositions or may have one or more gradient-type shells in which the ratio of elements composing the shell varies in the shell.

Specific examples of the Group III element include In, Al, and Ga. Specific examples of the Group V element include P, N, and As. The composition forming the core is preferably, but not limited to, InP in view of luminous properties and safety.

Examples of the Group II element include, but not limited to, Zn and Mg. Examples of the Group VI element include S, Se, Te, and O. The composition forming the shell is preferably, but not limited to, ZnS, ZnSe, ZnSeS, ZnTeS, ZnTeSe, and the like in view of quantum confinement effects. In particular, when Zn is present on the surface of the semiconductor nanoparticle, the advantageous effects of the present invention are further exhibited.

When the shell has a plurality of shells, at least one of the shells having the compositions above is included. When the shell has a gradient-type shell in which the ratio of an element forming the shell varies in the shell, the shell does not necessarily have the composition as specified.

In the present invention, whether the shell covers at least a part of the core and the elemental distribution in the shell can be determined, for example, by compositional analysis using energy dispersive X-ray spectroscopy (TEM-EDX) using a transmission electron microscope.

An exemplary method of producing semiconductor nanoparticles will be disclosed below.

The core of a semiconductor nanoparticle can be formed by mixing a Group III precursor, a Group V precursor, and an additive, if necessary, in a solvent and heating the resultant precursor mixture.

A coordinating solvent or a non-coordinating solvent is used as the solvent. Examples of the solvent include 1-octadecene, hexadecane, squalane, oleylamine, trioctylphosphine, and trioctylphosphine oxide.

Examples of the Group III precursor include, but not limited to, acetates, carboxylates, and halides containing the Group III element.

Examples of the Group V precursor include, but not limited to, organic compounds and gases including the Group V element. When the precursor is gas, the core can be formed by allowing the precursor mixture excluding the gas to react while injecting the gas.

The semiconductor nanoparticle may include one or more kinds of elements other than Group III and Group V elements as long as the advantageous effects of the present invention are not impaired, and in this case, the precursor of the element is added when the core is formed.

Examples of the additive include, but not limited to, dispersants such as carboxylic acids, amines, thiols, phosphines, phosphine oxides, phosphinic acids, and phosphonic acids. The dispersant may also serve as a solvent.

After the core of the semiconductor nanoparticle is formed, a halide can be added, if necessary, to improve the luminous properties of the semiconductor nanoparticle.

In an embodiment, a metal precursor solution including an In precursor, and, if necessary, a dispersant added in a solvent is mixed under vacuum and temporarily heated at 100° C. to 300° C. for 6 hours to 24 hours. Subsequently, a P precursor is added, and the mixture is heated at 200° C. to 400° C. for 3 minutes to 60 minutes and thereafter cooled. Furthermore, a halogen precursor is added, and the mixture is heated at 25° C. to 300° C., preferably 100° C. to 300° C., and more preferably 150° C. to 280° C., resulting in a core particle dispersion liquid including core particles.

To the synthesized core particle dispersion liquid, a shell-forming precursor is added, whereby the semiconductor nanoparticle attains a core-shell structure, and the fluorescence quantum yield (QY) and the stability can be enhanced.

The element forming the shell presumably takes a structure such as an alloy or hetero structure or an amorphous structure on the surface of the core particle but may partially move to the interior of the core particle by diffusion.

The added shell-forming element is mainly present in the vicinity of the surface of the core particle and plays a role of protecting the semiconductor nanoparticle from external factors. In the core-shell structure of the semiconductor nanoparticle according to an embodiment of the present invention, the shell preferably covers at least a part of the core, and further preferably uniformly covers the entire surface of the core particle.

As the precursor added when the shell is formed, carboxylates such as acetates, propionates, myristates, and oleates, halides, organic salts, and the like can be used.

In an embodiment, after a Zn precursor and a Se precursor are added to the core particle dispersion liquid, the dispersion liquid is heated at 150° C. to 300° C., and preferably at 180° C. to 250° C., and thereafter a Zn precursor and a S precursor are added, and the dispersion liquid is heated at 200° C. to 400° C., and preferably at 250° C. to 350° C. The core-shell type semiconductor nanoparticle thus can be obtained.

The precursors of the shell may be mixed in advance and added at one time or multiple times or may be added separately at one time or separately multiple times. When the shell precursors are added multiple times, the temperature may be changed for heating after each addition of the shell precursors.

In the present invention, the method of preparing semiconductor nanoparticles is not limited. Besides the method described above, conventional production methods such as hot injection, a homogeneous solvent method, an inverse micelle method, and CVD, or any methods may be employed.

—Ligand—

In the semiconductor nanoparticle complex according to the present invention, a ligand is coordinated to the surface of the semiconductor nanoparticle. As used herein coordination means that a ligand chemically affects the surface of the semiconductor nanoparticle. A ligand may be bonded to the surface of the semiconductor nanoparticle by coordinate bonding or any other forms of bonding (for example, covalent bonding, ionic bonding, or hydrogen bonding), or the bond is not necessarily formed when at least a part of the surface of the semiconductor nanoparticle has a ligand.

In the present invention, the ligand coordinated to the semiconductor nanoparticle is an organic ligand having an organic group and a coordinating group. An organic ligand including a ligand I is coordinated to the surface of the semiconductor nanoparticle. Specifically, the semiconductor nanoparticle complex according to the present invention includes the ligand I and at least one kind of organic ligand other than the ligand I as ligands. The organic ligand other than the ligand I may be of one kind or two or more kinds.

The ligand I is a thiocarboxylic acid represented by the following general formula (1).

General formula (1):

$$\text{HS—X—(COOH)}_n \tag{1}$$

In general formula (1), X is a (n+1)-valent hydrocarbon group, and n is a natural number of 1 to 3. The ligand I may be of one single kind or a combination of two or more kinds.

In the semiconductor nanoparticle complex according to the present invention, the mole fraction of the ligand I in the entire organic ligand is 0.20 to 35.00 mol %, and preferably 0.20 to 30.00 mol %. When the mole fraction of the ligand I in the entire organic ligand is in the range above, the semiconductor nanoparticle complex can be dispersed in a polar organic dispersion medium while a high quantum yield is retained.

It is preferable that the ligand I has a molecular weight of 300 or less. With the molecular weight of the ligand I of 300 or less, the dispersibility in an organic solvent is improved.

The ligand I is preferably one or more kinds selected from the group consisting of thioglycolic acid, mercaptopropionic acid, mercaptohexanoic acid, mercaptoundecanoic acid, and thiomalic acid, and further preferably one or more kinds selected from the group consisting of thioglycolic acid, mercaptopropionic acid, and thiomalic acid.

Examples of the organic ligand other than the ligand I include a polar ligand II. The polar ligand II is a ligand including a group having uneven distribution of charge in the organic group. The polar ligand II may be of one single kind or a combination of two or more kinds. It is preferable that the semiconductor nanoparticle complex according to the present invention includes the ligand I and the polar ligand II as the organic ligand. The SP value of the polar ligand II is preferably 9.0 or more, and further preferably 9.3 or more. With the SP value of the polar ligand II within the range above, the dispersibility in a polar solvent such as PGMEA is improved. The SP value of the polar ligand can be determined by calculation using the Y-MB method.

The coordinating group of the polar ligand II is preferably a carboxy group or a mercapto group. When the coordinating group of the polar ligand II is a carboxy group or a mercapto group, the long-term stability of the semiconductor nanoparticle complex is improved.

The organic group of the polar ligand II is not limited as long as the SP value of the polar ligand II is 9.0 or more, and may include a group such as an alkyl group, an alkynyl group, an alkenyl group, an alkoxy group, a hydroxy group, an aldehyde group, a carboxy group, an amino group, an imino group, a nitro group, a cyano group, a vinyl group, an aryl group, a halogen group, a ketone group, an ether bond, an ester bond, and a siloxane bond, and in particular, preferably include an ether bond or an ester bond. When the organic group of the polar ligand II includes an ether bond or an ester bond, the dispersibility of the semiconductor nanoparticle complex in a highly polar organic dispersion medium is improved.

It is preferable that the molecular weight of the polar ligand II is greater than the molecular weight of the ligand I. With the molecular weight of the polar ligand II greater than the molecular weight of the ligand I, the dispersibility of the semiconductor nanoparticle complex in an organic dispersion medium is improved.

An example of the organic ligand other than the ligand I is an aliphatic ligand. When the organic ligand includes an aliphatic ligand, the window of dispersibility of the semiconductor nanoparticle complex is widened, and dispersion media having a broader range of SP values can be selected as the organic dispersion medium. The aliphatic ligand may be of one single kind or a combination of two or more kinds. The aliphatic ligand is preferably one or more kinds selected from the group consisting of aliphatic thiols, aliphatic carboxylic acids, aliphatic amines, aliphatic phosphines, and aliphatic phosphine oxides. It is preferable that the organic ligand include the polar ligand II and the aliphatic ligand in addition to the ligand I.

When the organic ligand includes the polar ligand II and the aliphatic ligand in addition to the ligand I, the molar ratio of the aliphatic ligand to the polar ligand II (aliphatic ligand/polar ligand II) is preferably 0.10 to 5.00, and more preferably 0.10 to 3.00. When the molar ratio of the aliphatic ligand to the polar ligand II (aliphatic ligand/polar ligand II) is within the range above, the window of dispersibility is widened, and dispersion media having a broader range of SP values can be selected as the dispersion medium.

When the organic ligand includes the polar ligand II and/or the aliphatic ligand, the mole fraction of the total mole of the ligand II and the aliphatic ligand in the entire organic ligand is preferably 58.50 to 99.80 mol %, and particularly preferably 66.50 to 99.80 mol %.

When the organic ligand includes the polar ligand II and/or the aliphatic ligand, the mole fraction of the total mole of the ligand I, the ligand II, and the aliphatic ligand in the entire organic ligand is preferably 90.0 to 100.0 mol %, and particularly preferably 95.0 to 100.0 mol %.

Dispersion Liquid

A semiconductor nanoparticle complex dispersion liquid according to the present invention is a semiconductor nanoparticle complex dispersion liquid in which the semiconductor nanoparticle complex according to the present invention is dispersed in an organic dispersion medium. The semiconductor nanoparticle complex according to the present invention can be dispersed in an organic dispersion medium to form a semiconductor nanoparticle complex dispersion liquid. In the present invention, a state in which the semiconductor nanoparticle complex is dispersed in a dispersion medium refers to a state in which the semiconductor nanoparticle complex is not precipitated or a state in which it does not remain as a visible turbidity (haze) when the semiconductor nanoparticle complex and the dispersion medium are mixed. The product in which the semiconductor nanoparticle complex is dispersed in an organic dispersion medium is referred to as the semiconductor nanoparticle complex dispersion liquid.

The semiconductor nanoparticle complex according to the present invention is dispersed in an organic dispersion medium having an SP value of 8.0 or more, further in an organic dispersion medium having an SP value of 9.0 or more, and even in an organic dispersion medium having an SP value of 10.0 or more to form a semiconductor nanoparticle complex dispersion liquid. As used herein the SP value is a value calculated from Hansen solubility parameters, in the same manner as the method of determining the SP value of the polar ligand. Hansen solubility parameters can be determined using a handbook, for example, the values in "Hansen Solubility Parameters: A User's Handbook", the 2nd edition, C. M. Hansen (2007) or Practice (HSPiP) program (the 2nd edition) provided by Hanson and Abbot et al. An organic dispersion medium not listed in the handbook can be determined by calculation using the Y-MB method.

The organic dispersion medium into which the semiconductor nanoparticle complex according to the present invention is dispersed can be selected from alcohols such as methanol, ethanol, isopropyl alcohol, and n-propyl alcohol, ketones such as acetone, methyl ethyl ketone, methyl isobutyl ketone, cyclopentanone, and cyclohexanone, esters such as methyl acetate, ethyl acetate, isopropyl acetate, n-propyl acetate, n-butyl acetate, and ethyl lactate, ethers such as diethyl ether, dipropyl ether, dibutyl ether, and tetrahydrofuran, glycol ethers such as ethylene glycol monomethyl ether, ethylene glycol monoethyl ether, diethylene glycol monomethyl ether, ethylene glycol diethyl ether, diethylene glycol dimethyl ether, propylene glycol monomethyl ether (PGME), propylene glycol monoethyl ether, propylene glycol monopropyl ether, propylene glycol monobutyl ether, propylene glycol dimethyl ether, dipropylene glycol dimethyl ether, propylene glycol diethyl ether, and dipropylene glycol diethyl ether, and glycol ether esters such as ethylene glycol acetate, ethylene glycol monoethyl ether acetate, diethylene glycol monoethyl ether acetate, diethylene glycol monobutyl ether acetate, propylene glycol monomethyl ether acetate (PGMEA), and dipropylene glycol monoethyl ether acetate. The semiconductor nanoparticle complex is dispersed in these organic dispersion media and thereby can be used with the dispersibility of the semiconductor nanoparticle complex retained when applied to dispersion in a cured film or a resin described later.

The semiconductor nanoparticle complex according to the present invention can be dispersed in PGMEA or PGME. In the field of photoresists, PGMEA and PGME are commonly used as a diluent solvent, and if the semiconductor nanoparticle complex is dispersible in PGMEA and PGME, the semiconductor nanoparticle complex can be widely applied in the field of photoresists.

In the semiconductor nanoparticle complex dispersion liquid according to the present invention, the semiconductor nanoparticle complex according to the present invention allows semiconductor nanoparticles to be dispersed in the amount of 25 mass % or more, and preferably 30 mass % or more by mass fraction.

Semiconductor Nanoparticle Complex Composition

A semiconductor nanoparticle complex composition according to the present invention is a semiconductor nanoparticle complex composition in which the semiconductor nanoparticle complex according to the present invention is dispersed in a monomer or a prepolymer. The semiconductor nanoparticle complex composition can be formed by selecting a monomer or a prepolymer as an organic dispersion medium of the semiconductor nanoparticle complex dispersion liquid according to the present invention.

The monomer is preferably, but not limited to, a (meth) acrylic monomer by which applications of semiconductor nanoparticles can be selected widely. The (meth)acrylic monomer is selected from, depending on the applications of the semiconductor nanoparticle dispersion liquid, (meth) acrylic monomers such as methyl (meth)acrylate, ethyl (meth)acrylate, propyl (meth)acrylate, butyl (meth)acrylate, isobutyl (meth)acrylate, isoamyl (meth)acrylate, octyl (meth)acrylate, 2-ethylhexyl (meth)acrylate, dodecyl (meth) acrylate, isodecyl (meth)acrylate, lauryl (meth)acrylate, stearyl (meth)acrylate, cyclohexyl (meth)acrylate, isobornyl (meth)acrylate, 3,5,5-trimethylcyclohexanol (meth)acrylate, dicyclopentanyl (meth)acrylate, dicyclopentenyl (meth) acrylate, methoxyethyl (meth)acrylate, ethylcarbitol (meth) acrylate, methoxytriethylene glycol acrylate, 2-ethylhexyl diglycol acrylate, methoxypolyethylene glycol acrylate, methoxydipropylene glycol acrylate, phenoxyethyl (meth) acrylate, 2-phenoxydiethylene glycol (meth)acrylate, 2-phenoxypolyethylene glycol (meth)acrylate ($n{\approx}2$), tetrahydrofurfuryl (meth)acrylate, 2-hydroxyethyl acrylate, 2-hydroxypropyl (meth)acrylate, 4-hydroxybutyl (meth) acrylate, 2-hydroxybutyl (meth)acrylate, dicyclopentanyloxylethyl (meth)acrylate, isobornyloxylethyl (meth)acrylate, adamantyl (meth)acrylate, dimethyladamantyl (meth) acrylate, dicyclopentenyloxyethyl (meth)acrylate, benzyl (meth)acrylate, ω-carboxy-polycaprolactone ($n{\approx}2$) monoacrylate, 2-hydroxy-3-phenoxypropyl acrylate, 2-hydroxy-3-phenoxyethyl (meth)acrylate, (2-methyl-2-ethyl-1,3-dioxolan-4-yl)methyl (meth)acrylate, (3-ethyloxetan-3-yl) methyl (meth)acrylate, o-phenylphenolethoxy (meth) acrylate, dimethylamino (meth)acrylate, diethylamino (meth)acrylate, 2-(meth)acryloyloxyethyl phthalate, 2-(meth)acryloyloxyethyl hexahydrophthalate, glycidyl (meth)acrylate, 2-(meth)acryloyloxyethyl phosphate, acryloylmorpholine, dimethyl acrylamide, dimethylaminopropyl acrylamide, isopropyl acrylamide, diethyl acrylamide, hydroxyethyl acrylamide, and N-acryloyloxyethyl hexahydrophthalimide. These may be used singly or may be used in combination of two or more kinds. In particular, the acrylic monomer is preferably one kind or a mixture of two or more kinds selected from lauryl (meth)acrylate and 1,6-hexanediol di(meth)acrylate, depending on the applications of the semiconductor nanoparticle dispersion medium.

A prepolymer can be selected as the organic dispersion medium of the semiconductor nanoparticle complex dispersion liquid according to the present invention. Examples of the prepolymer include, but not limited to, acrylic resin prepolymers, silicone resin prepolymers, and epoxy resin prepolymers. Furthermore, the semiconductor nanoparticle complex composition according to the present invention may include a crosslinking agent.

The crosslinking agent is selected from polyfunctional (meth)acrylates, polyfunctional silane compounds, polyfunctional amines, polyfunctional carboxylic acids, polyfunctional thiols, polyfunctional alcohols, polyfunctional isocyanates, and the like, depending on the kind of monomer in the semiconductor nanoparticle complex composition.

Furthermore, the semiconductor nanoparticle complex composition according to the present invention may include a variety of organic solvents that do not influence curing, such as aliphatic hydrocarbons such as pentane, hexane, cyclohexane, isohexane, heptane, octane, and petroleum ethers, alcohols, ketones, esters, glycol ethers, glycol ether esters, aromatic hydrocarbons such as benzene, toluene, xylene, and mineral spirits, and alkyl halides such as dichloromethane and chloroform. The organic solvents above can be used not only for dilution of the semiconductor nanoparticle complex composition but also as an organic dispersion medium. In other words, the semiconductor nanoparticle complex according to the present invention can be dispersed in the organic solvents above to form a semiconductor nanoparticle complex dispersion liquid.

In addition, the semiconductor nanoparticle complex composition according to the present invention may include an initiator, a scattering agent, a catalyst, a binder, a surfactant, an adhesion promotor, an antioxidant, a UV absorber, an aggregation inhibitor, and a dispersant, as appropriate depending on the kind of monomer in the semiconductor nanoparticle complex composition.

Furthermore, the semiconductor nanoparticle complex composition according to the present invention may include a scattering agent in order to improve the optical properties of the semiconductor nanoparticle complex composition or a semiconductor nanoparticle complex cured film according to the present invention described later. The scattering agent is a metal oxide such as titanium oxide or zinc oxide, and the particle size thereof is preferably 100 nm to 500 nm. In view of the scattering effect, the particle size of the scattering agent is further preferably 200 nm to 400 nm. The inclusion of the scattering agent improves the absorbance roughly twofold. The amount of the scattering agent included in the composition is preferably 2 mass % to 30 mass %, and more preferably 5 mass % to 20 mass % in view of retaining the pattern characteristics of the composition.

Diluted Composition

A diluted composition according to the present invention is produced by diluting the semiconductor nanoparticle complex composition according to the present invention with an organic solvent.

Examples of the organic solvent for diluting the semiconductor nanoparticle composition include, but not limited to, aliphatic hydrocarbons such as pentane, hexane, cyclohexane, isohexane, heptane, octane, and petroleum ethers, alcohols, ketones, esters, glycol ethers, glycol ether esters, aromatic hydrocarbons such as benzene, toluene, xylene, and mineral spirits, and alkyl halides such as dichloromethane and chloroform. Among these, glycol ethers and glycol ether esters are preferable in view of the solubility in a wide variety of resins and the film uniformness in coating.

Semiconductor Nanoparticle Complex Cured Film

In the present invention, a semiconductor nanoparticle complex cured film refers to a film containing the semiconductor nanoparticle complex and which is cured. The semiconductor nanoparticle complex cured film can be obtained by curing the semiconductor nanoparticle complex composition or the diluted composition into a film.

The semiconductor nanoparticle complex cured film according to the present invention includes the semiconductor nanoparticle complex and a polymer matrix.

Examples of the polymer matrix include, but not limited to, (meth)acrylic resins, silicone resins, epoxy resins, maleic resins, butyral resins, polyester resins, melamine resins, phenolic resins, and polyurethane resins. The semiconductor nanoparticle complex cured film may be obtained by curing the semiconductor nanoparticle complex composition. The semiconductor nanoparticle complex cured film may further include a crosslinking agent.

The film can be cured by, but not limited to, any methods suitable for the composition forming a film, such as thermal treatment and ultraviolet treatment.

It is preferable that the semiconductor nanoparticle and the ligand coordinated to the surface of the semiconductor nanoparticle that are included in the semiconductor nanoparticle complex cured film according to the present invention compose the semiconductor nanoparticle complex.

Since the semiconductor nanoparticle complex cured film according to the present invention contains a high mass fraction of the semiconductor nanoparticle complex, the absorbance of the semiconductor nanoparticle complex cured film can be enhanced. When the semiconductor nanoparticle complex cured film has a thickness of 10 μm, the absorbance is preferably 1.0 or more, more preferably 1.3 or more, and further preferably 1.5 or more, for light having a wavelength of 450 nm from a direction perpendicular to the semiconductor nanoparticle complex cured film.

Furthermore, since the semiconductor nanoparticle complex cured film according to the present invention contains the semiconductor nanoparticle complex having high luminous properties, the semiconductor nanoparticle complex cured film having high luminous properties can be provided. The fluorescence quantum yield of the semiconductor nanoparticle complex cured film is preferably 70% or higher, and further preferably 80% or higher.

The thickness of the semiconductor nanoparticle complex cured film is preferably 50 μm or less, more preferably 20 μm or less, and further preferably 10 μm or less, in order to miniaturize the devices employing the semiconductor nanoparticle complex cured film.

The configurations and/or methods described in the present description are illustrated by way of example and susceptible to a number of modifications, and it is understood that these specific examples or examples should not be taken in any limitative sense. The specific procedure or method described in the present description may represent one of a number of process methods. Various actions explained and/or described can be performed in the order of description and/or explanation, or can be omitted. Similarly, the order of the method can be changed.

The subject of the present disclosure includes all novel and non-obvious combinations and subsidiary combinations of a variety of methods, systems, and configurations disclosed in the present description as well as other features, functions, actions, and/or characteristics, and all equivalents thereof.

EXAMPLES

Although the present invention will be described in detail below with examples and comparative examples, the present invention is not limited to these examples.

Example 1

An InP-based semiconductor nanoparticle complex was produced according to the following method.
<Production of Core Particles>
Indium acetate (0.3 mmol) and zinc oleate (0.6 mmol) were added to a mixture of oleic acid (0.9 mmol), 1-dodecanethiol (0.1 mmol), and octadecene (10 mL), and the mixture was heated under vacuum (<20 Pa) to about 120° C. and allowed to react for one hour. The mixture allowed to react under vacuum was introduced into a nitrogen atmosphere at 25° C., and after addition of tris(trimethylsilyl) phosphine (0.2 mmol), heated to about 300° C. and allowed to react for 10 minutes. The reaction liquid was cooled to 25° C., and octanoic acid chloride (0.45 mmol) was injected. The liquid was heated at about 250° C. for 30 minutes, followed by cooling to 25° C. to obtain a dispersion liquid of InP-based semiconductor nanoparticles.

A core-shell type semiconductor nanoparticle was produced using this InP-based semiconductor nanoparticle as a core and forming a shell on the core surface as described below, and the optical properties were determined.
(Precursors for Shell Forming)
In production of a shell, the following precursors were first prepared.
—Preparation of Zn Precursor Solution—
A Zn precursor of [Zn]=0.4 M was prepared by mixing 40 mmol of zinc oleate and 75 mL of octadecene and heating the mixture under vacuum at 110° C. for one hour.
—Preparation of Se Precursor (Trioctylphosphine Selenide)—
Trioctylphosphine selenide of [Se]=2.2 M was obtained by mixing 22 mmol of selenium powder and 10 mL of trioctylphosphine in nitrogen and stirring the mixture until the mixture was completely dissolved.
—Preparation of S Precursor (Trioctylphosphine Sulfide)—
Trioctylphosphine sulfide of [S]=2.2M was obtained by mixing 22 mmol of sulfur powder and 10 mL of trioctylphosphine in nitrogen and stirring the mixture until the mixture was completely dissolved.

Using the precursors obtained as described above, a shell was formed on the surface of the InP-based semiconductor nanoparticle (core) as follows.
(Formation of Shell)
A dispersion liquid of the core was heated to 200° C. At 200° C., 0.75 mL of the Zn precursor solution and the trioctylphosphine selenide (Se precursor) were simultaneously added and allowed to react for 30 minutes to form a ZnSe shell on a surface of the InP-based semiconductor nanoparticle.

Furthermore, 1.5 mL of the Zn precursor solution and 0.6 mmol of the trioctylphosphine sulfide (S precursor) were added, and the temperature was increased to 250° C. to allow the mixture to react for one hour to form a ZnS shell.

The reaction solution of the semiconductor nanoparticles obtained by synthesis was added to acetone and mixed well, and the mixture was then centrifuged. The centrifugal acceleration was set to 4,000 G. The precipitate was collected, and n-hexane was added to the precipitate to produce a dispersion liquid. This operation was repeated multiple times to obtain purified semiconductor nanoparticles.
(Ligand)
<Production of Single Ligand>
—Preparation Method of PEG-SH—
In a flask, 210 g of methoxy PEG-OH (molecular weight: 450) and 93 g of triethylamine were charged and dissolved in 420 mL of THF (tetrahydrofuran). The solution was cooled to 0° C., and 51 g of methanesulfonic acid chloride was slowly added dropwise in a nitrogen atmosphere carefully so that the temperature of the reaction solution did not exceed 5° C. due to reaction heat. Subsequently, the reaction solution was heated to room temperature and stirred for two hours. This solution was extracted with a chloroform-water system, and an organic phase was collected. The resultant solution was dried over magnesium sulfate, and after magnesium sulfate was removed by filtration, the filtrate was condensed by evaporation to obtain an oil-like intermediate. This was put into another flask, to which 400 mL of a 1.3 M thiourea aqueous solution was added in a nitrogen atmosphere. After the solution was refluxed for two hours, 21 g of NaOH was added, and the solution was further refluxed for 1.5 hours. The reaction solution was cooled to room temperature and neutralized to pH=7 with a 1 M HCl aqueous solution. The resultant solution was extracted with a chloroform-water system to obtain a ligand of interest (PEG-SH, molecular weight: 450).
—Preparation Method of Triethylene Glycol Monomethyl Ether Thiol (TEG-SH)—
Triethylene glycol monomethyl ether thiol (TEG-SH) was obtained by replacing 210 g of methoxy PEG-OH (molecular weight: 450) with 77 g of triethylene glycol monomethyl ether and performing preparation in the same manner as described above.
—Preparation Method of Mercaptopropionic Acid PEG Ester—
In a flask, 4.2 g of 3-mercaptopropionic acid (40 mmol), 21.6 g of methoxy PEG-OH (molecular weight: 450, 48 mmol), and 0.2 g of concentrated sulfuric acid were mixed in a nitrogen atmosphere. While the solution was stirred at 60° C., the pressure was reduced to 30 mmHg or lower to allow the solution to react for 24 hours. The reaction solution was cooled to room temperature, and then dissolved in toluene and washed using saturated sodium bicarbonate water, water, and saturated saline water successively. The resultant organic phase was dried using magnesium sulfate, and then the organic phase was filtered and condensed by evaporation to obtain a ligand of interest (mercaptopropionic acid PEG ester, molecular weight: 550).
—Preparation Method of PEG-COOH—
Methoxy PEG-OH (molecular weight: 400, 15 g) was dissolved in toluene (100 mL) at 60° C., and 4.2 g of potassium tert-butoxide was added to allow the mixture to react for six hours. Subsequently, 5.5 g of ethyl bromoacetate was added to the mixture, and the hydroxy group in PEG was protected by an ethyl acetate group. The mixture was filtered, and the filtrate was precipitated in diethyl ether. The precipitate was dissolved in a 1 M NaOH solution (40 mL), with addition of NaCl (10 g), the solution was stirred at room temperature for one hour, and the ethyl group at the end of PEG was removed. This solution was adjusted to pH 3.0 with addition of 6 M HCl. The resultant solution was extracted with a chloroform-water system to obtain PEG-COOH with a molecular weight of 450.

Production of Semiconductor Nanoparticle
Complex

In a flask, a semiconductor nanoparticle 1-octadecene dispersion liquid was prepared by dispersing the purified semiconductor nanoparticles in the amount of 10 mass % by mass ratio in 1-octadecene. In a flask, 10.0 g of the prepared semiconductor nanoparticle 1-octadecene dispersion liquid was charged, and 0.08 g of thioglycolic acid as a thiocarboxylic acid, 4.0 g of triethylene glycol monomethyl ether thiol (TEG-SH) as a polar ligand, and 1.0 g of dodecanethiol as an aliphatic ligand were added. The mixture was stirred in a nitrogen atmosphere at 110° C. for 60 minutes and cooled to 25° C. to obtain a semiconductor nanoparticle complex. The reaction solution including the semiconductor nanoparticle complex was put into a centrifuge tube and centrifuged at 4,000 G for 20 minutes to separate into a transparent 1-octadecene phase and a semiconductor nanoparticle complex phase. The 1-octadecene phase was removed, and the remaining semiconductor nanoparticle complex phase was collected.

To the resultant semiconductor nanoparticle complex phase, 5.0 mL of acetone was added to produce a dispersion liquid. To the resultant dispersion liquid, 50 mL of n-hexane was added, and the dispersion liquid wad centrifuged at 4,000 G for 20 minutes. After the centrifugation, a transparent supernatant was removed, and a precipitate was collected. This operation was repeated multiple times to obtain a purified semiconductor nanoparticle complex.

Details of Analyses (Fluorescence Quantum Yield Determination)

The optical properties of the semiconductor nanoparticles were determined using a quantum yield measurement system (QE-2100 manufactured by Otsuka Electronics Co., Ltd.). The semiconductor nanoparticle complex obtained by the synthesis was taken and dispersed in a dispersion medium and irradiated with excitation light to obtain an emission spectrum. The fluorescence quantum yield (QY) and the full width at half maximum (FWHM) are calculated from an emission spectrum after re-excitation correction, in which a re-excitation fluorescence emission spectrum of re-excited fluorescence emission is eliminated from the obtained emission. PGMEA was used as the dispersion liquid. The resultant fluorescence properties and the full width at half maximum were listed in Table 2.

(Stability Test)

Chloroform was added to the purified semiconductor nanoparticle complex so that the concentration of semiconductor nanoparticles was 1 mass %. The prepared solution was left to stand under fluorescent lamp illumination at room temperature for 72 hours. The fluorescence quantum yields before and after still standing were determined based on the method described above, and the stability (the fluorescence quantum yield before still standing/the fluorescence quantum yield after still standing×100) was calculated. The resultant stability was listed in Table 2.

(Thermogravimetric Analysis)

The purified semiconductor nanoparticle complex was heated to 550° C. by simultaneous thermogravimetry/differential thermal analysis (DTA-TG), held for 10 minutes, and cooled. The residual mass after analysis was considered as the mass of the semiconductor nanoparticles, and based on this value, the mass ratio of the semiconductor nanoparticles to the semiconductor nanoparticle complex was determined.

(Dispersibility Test)

With reference to the above mass ratio determined by DTA-TG, an organic dispersion medium (lauryl acrylate (LA), propylene glycol monomethyl ether acetate (PG-MEA), or ethanol) was added to the semiconductor nanoparticle complex so that the concentration of semiconductor nanoparticles was 1 mass %, and the dispersion state at that time was observed. Those dispersed were denoted by ○ and those with precipitation and haze observed were denoted by x in Table 2.

(1H-NMR Measurement)

For the purified semiconductor nanoparticle complex, the ligands coordinated to the semiconductor nanoparticles were analyzed using a nuclear magnetic resonance (NMR) spectrometer (JNM-LA400 manufactured by JEOL Ltd.). In the measurement of all the samples, using deuterated chloroform as a solvent and tetramethylsilane as an internal standard substance for chemical shift, 1H-NMR was measured. A signal attributable to the alkyl group of oleic acid was observed in the vicinity of 0.8 ppm to 2.5 ppm of the semiconductor nanoparticle complex obtained in Example 1, a signal attributable to the methylene group of thioglycolic acid was observed in the vicinity of 3.3 ppm, and a signal attributable to the ethylene glycol skeleton of TEG-SH was observed in the vicinity of 3.5 ppm to 4.0 ppm. The abundance ratio of each ligand was calculated based on the area ratio of these signals. Based on the abundance ratio of each ligand, the molar ratio of the ligand I to the entire organic ligand and the molar ratio of the aliphatic ligand to the polar ligand were calculated and listed in Table 1.

Example 2

A semiconductor nanoparticle complex was obtained by the same method as in Example 1 except that 0.01 g of 3-mercaptopropionic acid was used as a thiocarboxylic acid, 4.0 g of methyl mercaptopropionate was used as a polar ligand, and 1.0 g of oleic acid was used as an aliphatic ligand in the process of producing a semiconductor nanoparticle complex.

Example 3

A semiconductor nanoparticle complex was obtained by the same method as in Example 1 except that 0.01 g of 3-mercaptopropionic acid was used as a thiocarboxylic acid, 4.0 g of PEG-SH was used as a polar ligand, and 1.0 g of oleic acid was used as an aliphatic ligand in the process of producing a semiconductor nanoparticle complex.

Example 4

A semiconductor nanoparticle complex was obtained by the same method as in Example 1 except that 0.03 g of thiomalic acid was used as a thiocarboxylic acid, 4.0 g of PEG-SH was used as a polar ligand, and 1.0 g of oleic acid was used as an aliphatic ligand in the process of producing a semiconductor nanoparticle complex.

Example 5

A semiconductor nanoparticle complex was obtained by the same method as in Example 1 except that 0.08 g of 6-mercaptohexanoic acid was used as a thiocarboxylic acid, 4.0 g of mercaptopropionic acid PEG ester was used as a polar ligand, and 1.0 g of oleic acid was used as an aliphatic ligand in the process of producing a semiconductor nanoparticle complex.

Example 6

A semiconductor nanoparticle complex was obtained by the same method as in Example 1 except that 0.13 g of 11-mercaptoundecanoic acid was used as a thiocarboxylic acid, 4.0 g of mercaptopropionic acid PEG ester was used as a polar ligand, and 1.0 g of oleic acid was used as an aliphatic ligand in the process of producing a semiconductor nanoparticle complex.

Example 7

A semiconductor nanoparticle complex was obtained by the same method as in Example 1 except that 0.25 g of 3-mercaptopropionic acid was used as a thiocarboxylic acid, 4.0 g of PEG-COOH was used as a polar ligand, and 1.0 g of oleic acid was used as an aliphatic ligand in the process of producing a semiconductor nanoparticle complex.

Example 8

A semiconductor nanoparticle complex was obtained by the same method as in Example 1 except that 0.5 g of 3-mercaptopropionic acid was used as a thiocarboxylic acid, 4.0 g of PEG-SH was used as a polar ligand, and 1.0 g of oleic acid was used as an aliphatic ligand in the process of producing a semiconductor nanoparticle complex.

Example 9

A semiconductor nanoparticle complex was obtained by the same method as in Example 1 except that 0.03 g of 3-mercaptopropionic acid was used as a thiocarboxylic acid, 2.5 g of PEG-SH was used as a polar ligand, and 2.5 g of oleic acid was used as an aliphatic ligand in the process of producing a semiconductor nanoparticle complex.

Example 10

A semiconductor nanoparticle complex was obtained by the same method as in Example 1 except that 0.03 g of 3-mercaptopropionic acid was used as a thiocarboxylic acid, 2.0 g of PEG-SH was used as a polar ligand, and 3.0 g of oleic acid was used as an aliphatic ligand in the process of producing a semiconductor nanoparticle complex.

Example 11

In the process of producing a semiconductor nanoparticle complex, 0.03 g of 3-mercaptopropionic acid was used as a thiocarboxylic acid, 1.5 g of PEG-SH was used as a polar ligand, and 3.5 g of oleic acid was used as an aliphatic ligand. The mixture was stirred in a nitrogen atmosphere at 110° C. for 60 minutes and cooled to 25° C. to obtain a semiconductor nanoparticle complex. The reaction solution including the semiconductor nanoparticle complex was put into a centrifuge tube and, with addition of acetone, centrifuged at 4,000 G for 20 minutes to separate into a transparent organic phase and a semiconductor nanoparticle complex phase. The organic phase was removed, and the remaining semiconductor nanoparticle complex phase was collected. To the resultant semiconductor nanoparticle complex phase, 5.0 mL of n-hexane was added to produce a dispersion liquid. To the resultant dispersion liquid, 50 mL of acetone was added, and the dispersion liquid wad centrifuged at 4,000 G for 20 minutes. After the centrifugation, a transparent supernatant was removed, and a precipitate was collected. This operation was repeated multiple times to obtain a purified semiconductor nanoparticle complex. Hexane was used as a dispersion medium in the fluorescence quantum yield determination.

Example 12

A semiconductor nanoparticle complex was obtained by the same method as in Example 1 except that 0.03 g of thioglycolic acid was used as a thiocarboxylic acid, 4.9 g of TEG-SH was used as a polar ligand, and 0.1 g of dodecanethiol was used as an aliphatic ligand in the process of producing a semiconductor nanoparticle complex.

Example 13

In the process of producing a semiconductor nanoparticle complex, 0.03 g of thioglycolic acid was used as a thiocarboxylic acid, 5.0 g of PEG-SH was used as a polar ligand, and no aliphatic ligand was added. Except for this, a semiconductor nanoparticle complex was obtained by the same method as in Example 1.

Example 14

A semiconductor nanoparticle complex was obtained by the same method as in Example 1 except that 0.03 g of 3-mercaptopropionic acid was used as a thiocarboxylic acid, 4.0 g of PEG-NH$_2$ was used as a polar ligand, and 1.0 g of oleic acid was used as an aliphatic ligand in the process of producing a semiconductor nanoparticle complex.

Example 15

A semiconductor nanoparticle complex was obtained by the same method as in Example 1 except that 0.03 g of 3-mercaptopropionic acid was used as a thiocarboxylic acid, 3.5 g of 6-mercapto-1-hexanol was used as a polar ligand, and 1.5 g of oleic acid was used as an aliphatic ligand in the process of producing a semiconductor nanoparticle complex. Ethanol was used as a dispersion medium in the fluorescence quantum yield determination.

Example 16

A semiconductor nanoparticle complex was obtained by the same method as in Example 1 except that no thiocarboxylic acid was added, 4.0 g of methyl mercaptopropionate was used as a polar ligand, and 1.0 g of oleic acid was used as an aliphatic ligand in the process of producing a semiconductor nanoparticle complex.

Example 17

A semiconductor nanoparticle complex was obtained by the same method as in Example 1 except that 0.003 g of 3-mercaptopropionic acid was used as a thiocarboxylic acid, 4.0 g of methyl mercaptopropionate was used as a polar ligand, and 1.0 g of oleic acid was used as an aliphatic ligand in the process of producing a semiconductor nanoparticle complex.

Example 18

A semiconductor nanoparticle complex was obtained by the same method as in Example 1 except that 0.006 g of 3-mercaptopropionic acid was used as a thiocarboxylic acid, 4.0 g of methyl mercaptopropionate was used as a polar ligand, and 1.0 g of oleic acid was used as an aliphatic ligand in the process of producing a semiconductor nanoparticle complex.

Example 19

A semiconductor nanoparticle complex was obtained by the same method as in Example 1 except that 0.75 g of 3-mercaptopropionic acid was used as a thiocarboxylic acid, 4.0 g of PEG-SH was used as a polar ligand, and 1.0 g of oleic acid was used as an aliphatic ligand in the process of producing a semiconductor nanoparticle complex.

Example 20

A semiconductor nanoparticle complex was obtained by using 4.0 g of 3-mercaptopropionic acid as a thiocarboxylic acid, adding neither an aliphatic ligand nor a polar ligand, further adding a saturated sodium hydrogen carbonate solution, stirring in a nitrogen atmosphere at 80° C. for 12 hours, and cooling to 25° C. in the process of producing a semiconductor nanoparticle complex. The reaction solution including the semiconductor nanoparticle complex was put into a centrifuge tube and centrifuged at 4,000 G for 20 minutes to separate into a transparent 1-octadecene phase and an aqueous phase including the semiconductor nanoparticle complex. The aqueous phase was collected, and the semiconductor nanoparticle complex was reprecipitated in a large amount of methanol. The solid was collected by filtration to obtain a dried and purified semiconductor nanoparticle complex. Water was used as a dispersion medium in the fluorescence quantum yield determination.

The meaning of the abbreviations used in Table 1 to Table 2 is as follows.

TEG-SH: triethylene glycol monomethyl ether thiol
MPA-Me: methyl mercaptopropionate
DDT: dodecanethiol

TABLE 1

| | Kinds of ligand | | | SP value | Molecular weight | | | Ligand molar ratio | |
| | Ligand I | Ligand other than ligand I | | Polar | Ligand I | Ligand other than ligand I | | Ligand I/ entire | Aliphatic ligand/ |
| | Thiocarboxylic acid | Polar ligand II | Aliphatic ligand | ligand II | Thiocarboxylic acid | Polar ligand II | Aliphatic ligand | organic ligand | polar ligand |
|---|---|---|---|---|---|---|---|---|---|
| Example 1 | Thioglycolic acid | TEG—SH | DDT | 9.8 | 92 | 180 | 202 | 2.91 | 0.22 |
| Example 2 | 3-Mercaptopropionic acid | MPA—Me | Oleic acid | 10.4 | 106 | 120 | 282 | 0.23 | 0.11 |
| Example 3 | 3-Mercaptopropionic acid | PEG—SH | Oleic acid | 9.4 | 106 | 450 | 282 | 0.90 | 0.40 |
| Example 4 | Thiomalic acid | PEG—SH | Oleic acid | 9.4 | 150 | 450 | 282 | 1.32 | 0.40 |
| Example 5 | 6-Mercaptohexanoic acid | Mercaptopropionic acid PEG ester | Oleic acid | 9.5 | 148 | 550 | 282 | 4.47 | 0.49 |
| Example 6 | 11-Mercaptoundecanoic acid | Mercaptopropionic acid PEG ester | Oleic acid | 9.5 | 218 | 550 | 282 | 5.03 | 0.49 |
| Example 7 | 3-Mercaptopropionic acid | PEG—COOH | Oleic acid | 9.7 | 106 | 450 | 282 | 15.94 | 0.40 |
| Example 8 | 3-Mercaptopropionic acid | PEG—SH | Oleic acid | 9.4 | 106 | 450 | 282 | 27.50 | 0.40 |
| Example 9 | 3-Mercaptopropionic acid | PEG—SH | Oleic acid | 9.4 | 106 | 690 | 282 | 1.85 | 2.45 |
| Example 10 | 3-Mercaptopropionic acid | PEG—SH | Oleic acid | 9.4 | 106 | 690 | 282 | 1.71 | 3.67 |
| Example 11 | 3-Mercaptopropionic acid | PEG—SH | Oleic acid | 9.4 | 106 | 690 | 282 | 1.59 | 5.71 |
| Example 12 | Thioglycolic acid | TEG—SH | DDT | 9.8 | 92 | 180 | 202 | 0.97 | 0.02 |
| Example 13 | Thioglycolic acid | PEG—SH | — | 9.4 | 106 | 450 | — | 2.08 | 0.00 |
| Example 14 | 3-Mercaptopropionic acid | PEG—NH2 | Oleic acid | 9.1 | 106 | 500 | 282 | 1.71 | 0.35 |
| Example 15 | 3-Mercaptopropionic acid | 6-mercapto hexanol | Oleic acid | 10.8 | 106 | 134 | 282 | 0.74 | 0.20 |
| Example 16 | None | MPA—Me | Oleic acid | 10.4 | 106 | 120 | 282 | 0.00 | 0.11 |
| Example 17 | 3-Mercaptopropionic acid | MPA—Me | Oleic acid | 10.4 | 106 | 120 | 282 | 0.08 | 0.11 |

TABLE 1-continued

| | Kinds of ligand | | | SP value Polar ligand II | Molecular weight | | | Ligand molar ratio | |
|---|---|---|---|---|---|---|---|---|---|
| | Ligand I | Ligand other than ligand I | | | Ligand I | Ligand other than ligand I | | Ligand I/ entire | Aliphatic ligand/ |
| | Thiocarboxylic acid | Polar ligand II | Aliphatic ligand | ligand II | Thiocarboxylic acid | Polar ligand II | Aliphatic ligand | organic ligand | polar ligand |
| Example 18 | 3-Mercaptopropionic acid | MPA—Me | Oleic acid | 10.4 | 106 | 120 | 282 | 0.15 | 0.11 |
| Example 19 | 3-Mercaptopropionic acid | PEG—SH | Oleic acid | 9.4 | 106 | 450 | 282 | 36.27 | 0.40 |
| Example 20 | 3-Mercaptopropionic acid sodium salt | None | — | — | 106 | — | — | 100.00 | — |

*Ligand I/entire organic ligand: the ratio (mol %) of ligand I in the entire organic ligand
*Aliphatic ligand/polar ligand: the molar ratio of aliphatic ligand to polar ligand II

TABLE 2

| | Optical properties | | | | | |
|---|---|---|---|---|---|---|
| | | Full width at half | | Dispersibility Solvent (SP value) | | |
| | Quantum yield/% | maximum/ nm | Stability/ % | LA (8.1) | PGMEA (9.4) | Ethanol (13.0) |
| Example 1 | 89 | 37 | 99 | o | o | o |
| Example 2 | 86 | 36 | 99 | o | o | o |
| Example 3 | 88 | 37 | 100 | o | o | o |
| Example 4 | 88 | 36 | 99 | o | o | o |
| Example 5 | 89 | 36 | 100 | o | o | o |
| Example 6 | 89 | 37 | 100 | o | o | o |
| Example 7 | 85 | 37 | 99 | o | o | o |
| Example 8 | 88 | 37 | 100 | o | o | o |
| Example 9 | 87 | 36 | 99 | o | o | o |
| Example 10 | 88 | 37 | 99 | o | o | x |
| Example 11 | 87 | 37 | 100 | o | x | x |
| Example 12 | 87 | 36 | 100 | x | o | o |
| Example 13 | 88 | 36 | 98 | x | o | o |
| Example 14 | 85 | 37 | 84 | o | o | o |
| Example 15 | 85 | 37 | 94 | x | x | o |
| Example 16 | 79 | 37 | 96 | o | o | o |
| Example 17 | 80 | 37 | 99 | o | o | o |
| Example 18 | 81 | 37 | 88 | o | o | o |
| Example 19 | — | — | — | x | x | x |
| Example 20 | 29 | 42 | 75 | x | x | x |

The invention claimed is:

1. A semiconductor nanoparticle complex dispersion liquid comprising a semiconductor nanoparticle complex dispersed in an organic dispersion medium, the semiconductor nanoparticle complex comprising two or more organic ligands including a ligand I coordinated to a surface of a semiconductor nanoparticle, wherein an organic ligand of the two or more organic ligands is a ligand including an organic group and a coordinating group, the ligand I is a thiocarboxylic acid represented by the following general formula (1), a mole fraction of the ligand I in the two or more organic ligands is 0.20 mol % to 35.00 mol %, and the organic dispersion medium is a polar organic dispersion medium, general formula (1):

$$HS-X-(COOH)_n \qquad (1)$$

where X is a (n+1)-valent hydrocarbon group, and n is a natural number of 1 to 3.

2. The semiconductor nanoparticle complex dispersion liquid according to claim 1, wherein the ligand I comprises one or more kinds selected from the group consisting of thioglycolic acid, mercaptopropionic acid, mercaptohexanoic acid, mercaptoundecanoic acid, and thiomalic acid.

3. The semiconductor nanoparticle complex dispersion liquid according to claim 1, wherein the ligand I comprises one or more kinds selected from the group consisting of thioglycolic acid, mercaptopropionic acid, and thiomalic acid.

4. The semiconductor nanoparticle complex dispersion liquid according to claim 1, wherein the ligand I has a molecular weight of 300 or less.

5. The semiconductor nanoparticle complex dispersion liquid according to claim 1, wherein the two or more organic ligands further includes a polar ligand II having an SP value of 9.0 or more.

6. The semiconductor nanoparticle complex dispersion liquid according to claim 5, wherein the polar ligand II has an SP value of 9.3 or more.

7. The semiconductor nanoparticle complex dispersion liquid according to claim 5, wherein the polar ligand II has a molecular weight that is greater than a molecular weight of the ligand I.

8. The semiconductor nanoparticle complex dispersion liquid according to claim 5, wherein the polar ligand II includes an organic group and a coordinating group, and wherein the coordinating group of the polar ligand II is a carboxyl group or a mercapto group.

9. The semiconductor nanoparticle complex dispersion liquid according to claim 5, wherein the polar ligand II includes an organic group and a coordinating group, and wherein the organic group of the polar ligand II includes an ether bond or an ester bond.

10. The semiconductor nanoparticle complex dispersion liquid according to claim 5, wherein the two or more organic ligands further includes an aliphatic ligand.

11. The semiconductor nanoparticle complex dispersion liquid according to claim 10, wherein the aliphatic ligand comprises one or more kinds selected from the group consisting of aliphatic thiols, aliphatic carboxylic acids, aliphatic amines, aliphatic phosphines, and aliphatic phosphine oxides.

12. The semiconductor nanoparticle complex dispersion liquid according to claim 10, wherein a molar ratio of the aliphatic ligand to the polar ligand II (aliphatic ligand/polar ligand II) is 0.10 to 5.00.

13. The semiconductor nanoparticle complex dispersion liquid according to claim 10, wherein a molar ratio of the aliphatic ligand to the polar ligand II (aliphatic ligand/polar ligand II) is 0.10 to 3.00.

14. The semiconductor nanoparticle complex dispersion liquid according to claim 1, wherein the semiconductor nanoparticle comprises a core-shell structure having a core and a shell covering at least part of the core, and wherein the shell comprises.

15. The semiconductor nanoparticle complex dispersion liquid according to claim 1, wherein the semiconductor nanoparticle includes indium and phosphorus.

16. The semiconductor nanoparticle complex dispersion liquid according to claim 1, wherein a quantum yield of the semiconductor nanoparticle complex is 85% or higher.

17. The semiconductor nanoparticle complex according to claim 1, wherein a full width at half maximum of an emission spectrum of the semiconductor nanoparticle complex is 38 nm or less.

18. A semiconductor nanoparticle complex composition comprising a semiconductor nanoparticle complex dispersed in a dispersion medium, wherein the dispersion medium is a polar organic dispersion medium comprising a monomer or a prepolymer, the semiconductor nanoparticle complex comprises two or more organic ligands including a ligand I coordinated to a surface of a semiconductor nanoparticle, an organic ligand of the two or more organic ligands is a ligand including an organic group and a coordinating group, the ligand I is a thiocarboxylic acid represented by the following general formula (1), and a mole fraction of the ligand I in the two or more organic ligands is 0.20 mol % to 35.00 mol %, general formula (1):

$$HS{-}X{-}(COOH)_n \qquad (1)$$

where X is a (n+1)-valent hydrocarbon group, and n is a natural number of 1 to 3.

\* \* \* \* \*